(12) United States Patent
Einstein et al.

(10) Patent No.: US 9,788,084 B2
(45) Date of Patent: Oct. 10, 2017

(54) CONTENT-OBJECT SYNCHRONIZATION AND AUTHORING OF DYNAMIC METADATA

(71) Applicant: NBCUniversal Media, LLC, New York, NY (US)

(72) Inventors: Myra Einstein, New York, NY (US); Chris Seeger, Rockbille Centre, NY (US)

(73) Assignee: NBCUniversal, LLC, New York, NY (US)

( * ) Notice: Subject to any disclaimer, the term of this patent is extended or adjusted under 35 U.S.C. 154(b) by 496 days.

(21) Appl. No.: 13/897,272

(22) Filed: May 17, 2013

(65) Prior Publication Data

US 2014/0304597 A1 Oct. 9, 2014

Related U.S. Application Data (60) Provisional application No. 61/809,124, filed on Apr. 5, 2013.

(51) Int. Cl.
| | |
|---|---|
| *G06F 17/00* | (2006.01) |
| *H04N 21/8543* | (2011.01) |
| *H04N 21/235* | (2011.01) |
| *H04N 21/8547* | (2011.01) |

(52) U.S. Cl.
CPC ..... *H04N 21/8543* (2013.01); *H04N 21/2353* (2013.01); *H04N 21/8547* (2013.01)

(58) Field of Classification Search
CPC .... G06F 17/00; G06F 17/2247; G06F 17/211; G06F 17/227; G06F 17/248; G06F 3/0484; G06F 17/30796; G06F 17/30855; G06F 17/30787; G06F 17/30799; G06Q 10/10; H04N 21/8543; H04N 21/2353; H04N 21/8547
USPC ........................................ 715/235, 719, 716
See application file for complete search history.

(56) References Cited

U.S. PATENT DOCUMENTS

| | | | |
|---|---|---|---|
| 9,113,128 B1* | 8/2015 | Aliverti | H04N 9/79 |
| 2002/0077939 A1* | 6/2002 | Nicastro et al. | 705/29 |
| 2007/0250901 A1* | 10/2007 | McIntire et al. | 725/146 |
| 2008/0021926 A1* | 1/2008 | Brock et al. | 707/104.1 |

(Continued)

*Primary Examiner* — Scott Baderman
*Assistant Examiner* — Jason Edwards (57) ABSTRACT

A method and system are provided which allow for the standardization of object-oriented metadata for units of supplemental data and the improved association of video assets with objects. By defining such a standard, metadata can be added that addresses the lack of creative control and flexibility for authors of supplemental content and interactive elements. The system provided generates objects and a separate object track which is associated with specific assets in the audio/video tracks of produced content. According to one embodiment, the system provided may be implemented to include a central object database. Each object record may include an object's unique identification, a description of the object, and additional production details. Objects may be defined in local and central databases prior to and even during production. By defining a standard for supplemental and interactive data as objects, common objects may be referenced more efficiently, and the objects themselves may be represented (e.g., in a video editor) graphically and organized with greater efficacy.

30 Claims, 6 Drawing Sheets

(56) References Cited

U.S. PATENT DOCUMENTS

| | | | |
|---|---|---|---|
| 2010/0169910 A1* | 7/2010 | Collins et al. | 725/14 |
| 2012/0173980 A1* | 7/2012 | Dachs | G06Q 10/10 715/719 |
| 2013/0151970 A1* | 6/2013 | Achour | 715/723 |

* cited by examiner

CONTENT-OBJECT SYNCHRONIZATION AND AUTHORING OF DYNAMIC METADATA

CLAIM OF PRIORITY

This application claims the benefit of U.S. Provisional Application No. 61/809,124, entitled "Content-Object Synchronization" and filed Apr. 2, 2013 in the United States Patent and Trademark Office.

BACKGROUND

Recently, Internet-based streaming of audio and video content has dramatically increased in popularity. This has resulted in a corresponding surge in merging Internet-based content and broadcast content. This concept—sometimes referred to as a "second screen," "companion," or "enhanced" experience—allows a television audience to interact with the content they are consuming, such as TV shows, movies, music, or video games. In a typical second screen experience, additional, supplemental data is displayed on a secondary, internet-connected (and often portable) display device concurrent to the display of broadcast content (e.g., in a television, for example). Other enhanced programming can take place on the television screen itself with elements from the internet being displayed on top of or alongside the original broadcast content. This supplemental data is often synchronized with the broadcast content (referred to as media assets) being viewed, and is typically designed to heighten the user's viewing experience by increasing the level of user interaction with the displayed content. Examples of this supplemental data may include additional scenes or other media content, relevant information, interaction with other users and social media tools, additional displays of advertisement, or even present the user with an interface that the user may use to directly or collectively affect (and/or change) the actual content displayed.

Generally in the case of second screen and other enhanced experiences, the companion device or internet connected screen executes an application that recognizes (e.g., via user input or automatic content recognition) the current or imminent display of a media asset. The application then queries an appropriate data server (via the Internet, for example) and receives supplemental data corresponding to the media asset, if available. The display of the supplemental data is synchronized with the display of the media asset such that delivery of the broadcast content to the television (or other primary display device) and scene or time specific supplemental content to the companion display device or internet connected screen is performed simultaneously according to a pre-programmed track, or pushed to the application in real-time in the case of live events such as sporting events, performances, press events, or award shows.

However, generation and synchronization of this supplemental content can be difficult and/or inefficient, and currently, no unified standard exists for the generation and synchronization of supplemental content for produced media assets. Conventional techniques for generating synchronized supplemental content often include manually integrating the supplemental content with the produced video/audio tracks of the media asset, often without duplication and on an ad hoc basis. The resulting final output is generally a single, immutable sequence of broadcast content interspersed with supplemental content intended to be delivered as a series of pre-scheduled events. As such, changes to the audio/video tracks may be severely limited, and rapid or late modifications may be effectively precluded.

Moreover, this integration is typically performed only after the post-production of the media asset, and often by a separate editor or production team from the production of the media asset. As a result, supplemental content generated during the course of production of the broadcast or media asset may be lost or unavailable, or may require additional effort to integrate seamlessly within the produced media asset. In addition, creative decisions for the interactive content cannot be acted on while the actual edit process is occurring. With such a workflow, the interactive content must be authored either after the entire production and post-production process is completed (which can leave little time before the asset is scheduled to air) or risk manual retiming of all elements should any of the audio/video be changed in the editing process.

Finally, authoring of dynamic metadata may present another issue during the creative process. For example, conventional mixed format or mixed standard media assets may be extremely difficult and/or inefficient to produce as a single, contiguous asset. Conventionally, the edit to tape process for mixed format assets (e.g., television programs that contain both Standard and High definition content) requires a separate edit for each Active Format Description ("AFD") flag change from Standard definition (SD) to High definition (HD) programming. For some anthologies, this may represent an extremely user and time intensive amount to edit since flags can't be dynamically inserted into the file and passed through the transcode stage in the final part of the broadcast chain. Currently, there exists no means or standard in conventional editing software applications to author AFD dynamically. Moreover, the transcoder software also has no way of authoring dynamic AFD and applies a single AFD flag to the entire program. Closed captioning is another example where there is metadata (text) that has a relationship to the video and audio playing being edited and subsequently played back.

SUMMARY

As a solution to the type of problems noted above, this disclosure provides novel methods and systems for modeling a user's viewing profile across multiple sources and content providers. Aspects of the claimed subject matter will provide an extensible standard for authoring and storing many kinds of chronologically-based metadata.

According to one aspect of the claimed subject matter, a system is provided which allows the standardization of object-oriented metadata for units of supplemental data. By defining such a standard, metadata can be added that addresses the lack of creative control and flexibility for authors of supplemental content and interactive elements. The system provided generates objects and a separate object track that is associated with specific assets in the audio/video tracks of produced content.

According to one embodiment, the system provided may be implemented to include a central object database. Each object record may include an object's unique identification, a description of the object, and additional production details. Objects may be defined in local and central databases prior to and even during production. By defining a standard for supplemental and interactive data as objects, objects may be tracked and monitored, common objects may be referenced more efficiently, and the objects themselves may be represented (e.g., in a video editor) graphically and organized with greater efficacy.

According to another aspect of the claimed subject matter, a method is provided to generate supplemental content and interactive elements, and to associate the generated content with produced media assets. According to an embodiment, once a script for a media asset is completed, the script may be parsed to identify potential objects. The identified potential objects are referenced in a central database of objects, or authored (created) if no pre-existing reference of the object exists. Once the asset is produced, associations between the identified objects and the asset may be created in a video editor and exported as a completed product. In yet another aspect of the claimed subject matter, the method may be implemented as a series of programmed instructions, executable by a processor in a computing system.

Accordingly, by giving these authoring tools to the producers and editors of the original content, new types of programming can be realized. One example of which could be the easy creation of an audience-selected ending type of episode.

BRIEF DESCRIPTION OF DRAWINGS

The accompanying drawings, which are incorporated in and form a part of this specification, illustrate embodiments of the disclosure and, together with the description, serve to explain the principles of the presently claimed subject matter:

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although operations and sequencing thereof are disclosed in a figure herein describing the operations of this process, such operations and sequencing are exemplary. Embodiments are well suited to performing various other operations or variations of the operations recited in the flowchart of the figure herein, and in a sequence other than that depicted and described herein.

Some portions of the detailed description are presented in terms of procedures, operations, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed operation, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the following example configurations are shown as incorporating specific, enumerated features and elements, it is understood that such depiction is exemplary. Accordingly, embodiments are well suited to applications involving different, additional, or fewer elements, features, or arrangements.

Exemplary Object Record

Figure 1:
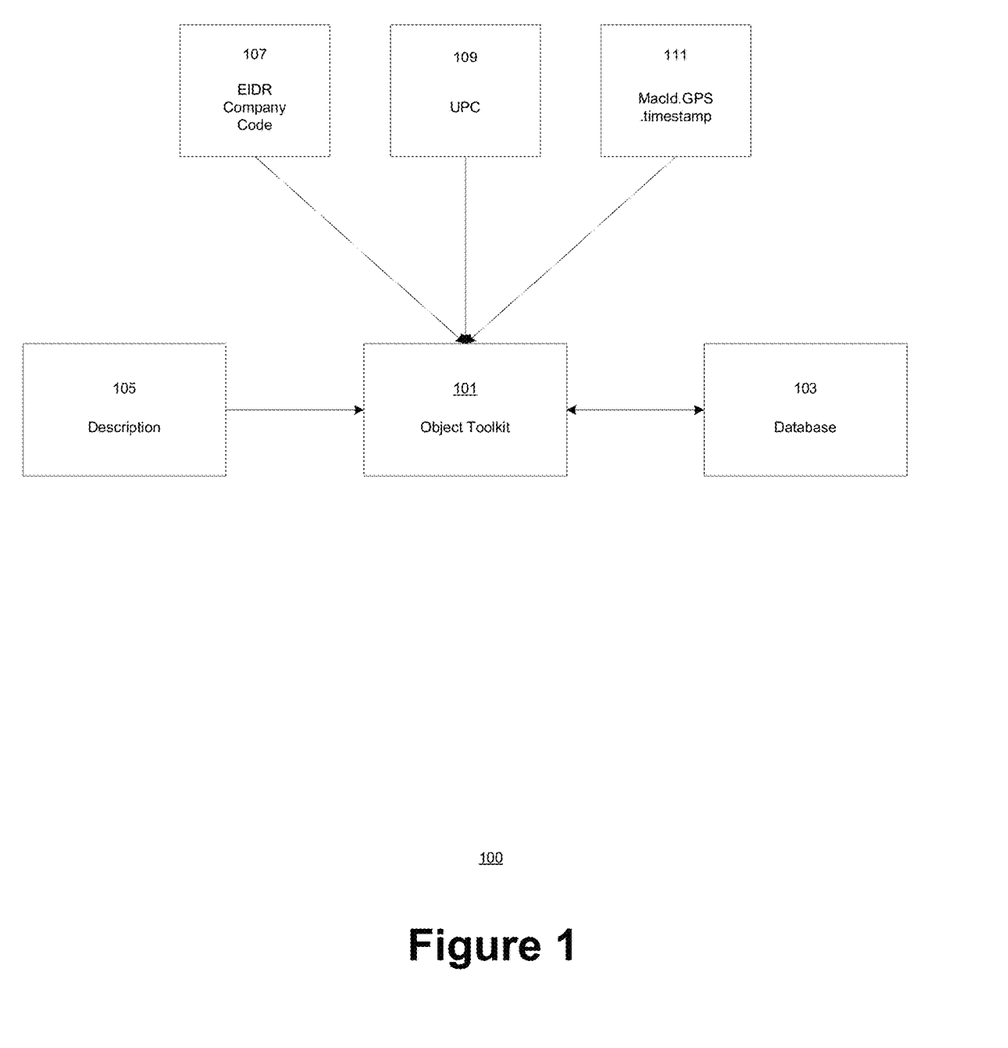
FIG. 1 depicts a block diagram of an object record in a central object database, in accordance with embodiments of the present disclosure.

FIG. 1 depicts a block diagram 100 of an object record system in accordance with embodiments of the present disclosure. In particular, FIG. 1 depicts the data types which may be included in an object record and the storage and transmission thereof.

According to various aspects of the presently claimed subject matter, an object record in an object database may be created for an object which represents an interactive element or unit of supplemental data that corresponds to a media asset, or an entity within the media asset. The object may comprise, for example, an additional media asset (e.g., bonus scenes, related music or video content, or images, etc.), relevant information (actor biographies, product information, scene information, etc.), directed advertising, or user-interactive elements (polls, social media interaction, user-solicited choices, branching content, received numeric data, etc.)

As depicted in FIG. 1, an object record may be created and/or referenced in an object toolkit application 101, and each object record may include a unique object identifier within the system (e.g., an Object UID) and a description of the object 105. Additional metadata may include the identification 107 (e.g., as an EIDR company code) of the production company of the media asset corresponding to the object. When the object corresponds to a product, the Universal Product Code (UPC) 109 of the product may also be included. In still further embodiments, the identity (e.g., MAC ID) and location (e.g., GPS coordinates) 111 of the computing device used to generate the object or object record and the date and time (e.g., a timestamp) at which the object is generated may also be included in the object record. In an embodiment, the data comprising an object record may be entered by a user via a graphical on-screen user interface of the object toolkit 101. In alternate embodiments, some or all of the data may be obtained automatically, by parsing files or documents (e.g., scripts) to identify pre-identified objects.

In some instances, an object record may also include a reference to the location of the particular supplemental unit or interactive element. For example, the object record may include the URL from which a supplemental video or plurality of images may be accessed from.

According to some embodiments, once created with the object toolkit 101, an object record may be one of a plurality of object records stored in an object record database 103 hosted on a computing device (such as a server). In still further embodiments, the object record database may be accessible to instantiations of the object toolkit application 101 executing on one or more additional computing devices which may be remotely located from the object record database 103. The object toolkit application 101 may be configured to allow a user of the application to access and reference object records from the object record database 103, or, alternately, to create, edit, or delete object records from the object record database 103. In some instances, authorization (via authentication procedures, for example) of the user of the toolkit must be established prior to performing one or more of the above named actions (e.g., access, create, edit, delete object records).

According to further embodiments, produced media assets may be arranged according to a linear, sequential timeline, with the particular arrangement of each media asset corresponding to the chronology of an intended presentation of the media asset. In some instances, the linear timeline may be represented as a sequence of frames. The particular positions of the assets within the timeline itself may be edited using a timeline editing application for media content, for example. According to such embodiments, a user of the object toolkit application 101 may be able to create associations between object records from the object record database 103 to one or more frames of a timeline of a media asset in the timeline editing application by editing a plug-in component of the application. Where the object records correspond to supplemental or interactive material, these generated associations may cause the simultaneous presentation of the additional material during the presentation of the associated media asset. For example, an object record which corresponds to a viewer poll may be displayed to a viewer of the media asset (e.g., super-imposed graphically over the original material) when the viewer watches or otherwise consumes the media asset. The generated object associations may themselves be stored, categorized, and tracked over time. The resulting records may be subsequently queried and/or filtered, and may result in substantially improved organization and more effective data analysis (e.g., identification of trends over time) of objects and entities.

In some instances, the associations between object records and the media assets may be implemented as instantiations of objects corresponding to the object records and arranged in a separate timeline called an object track. The particular configuration of objects within the object track may correspond to the chronology of the assets in the media content timeline that correspond to the objects. For example, for objects associated with an asset that is positioned earlier in the media content timeline, the position of object in the object track may be correspondingly early as well. When the position of an asset in the timeline is changed (via the editor), the position of corresponding objects in the object track may automatically change to correspond to the new position of the asset in the media timeline.

According to still further embodiments, the object track is capable of providing functionalities that extend beyond interactive authoring. These functionalities may include the ability to add other types of rich temporal metadata that relate directly to media elements in the authored project. Examples of such rich temporal metadata types may include, for example: dynamic AFD flags, scene changes, commercial position start/end times, pre-production metadata. According to such embodiments, the object track is able to become a flexible method of adding extensible, unique, temporal-based metadata that can then be exchanged between other authoring systems. In other instances, producers may be working on a live event which has a loose script, such as an awards ceremony (known award categories and nominees) or sporting events (known players and game segments) where content can be prepared ahead of time or created in real-time and organized in the central object database 103. In this case, the object track could exist without a video or audio track and be executed manually by an operator.

Media Asset Production

Figure 2:
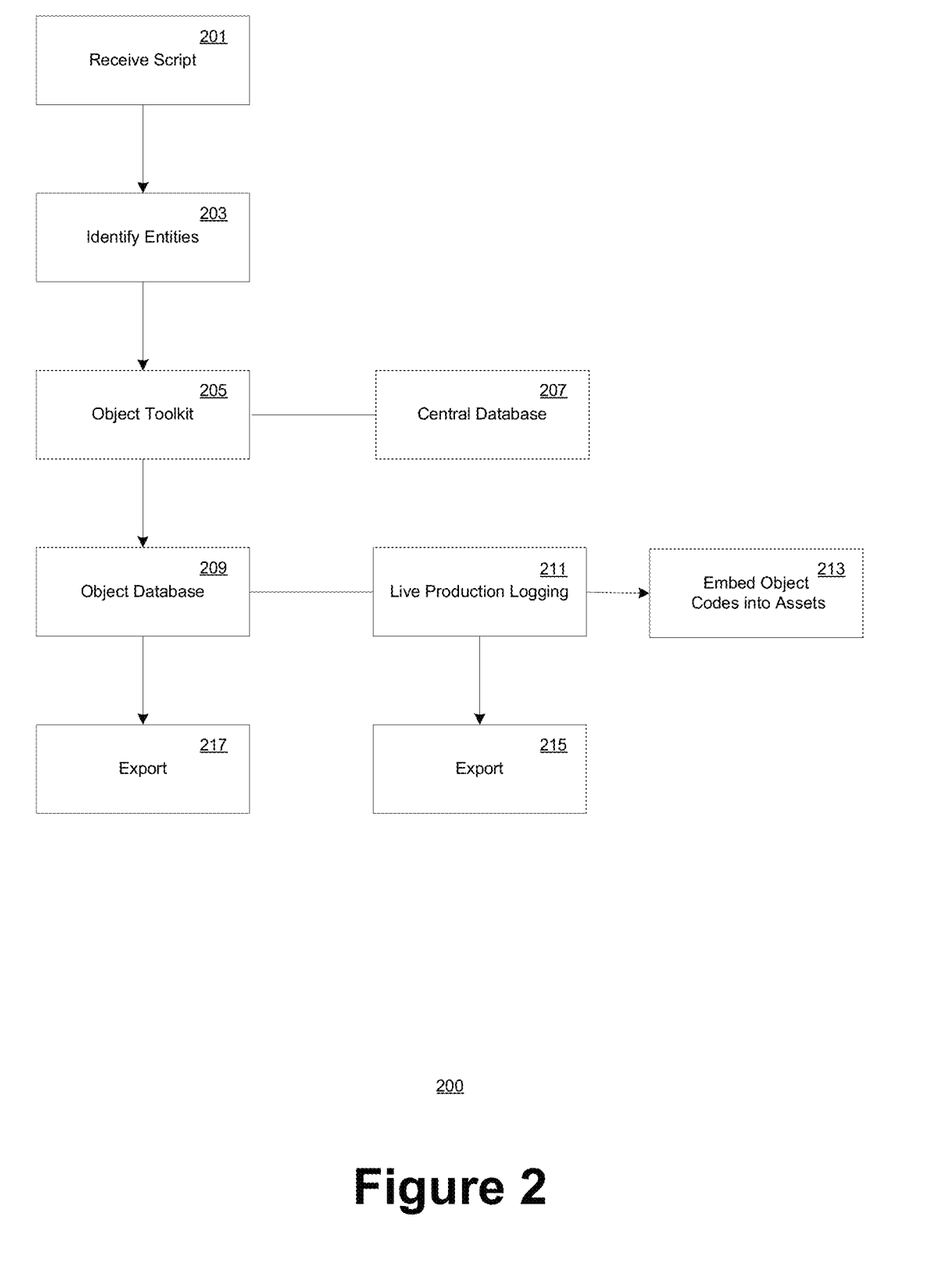
FIG. 2 depicts a flowchart of a process for producing a media asset with associated objects, in accordance with embodiments of the present disclosure.

With reference now to FIG. 2, a flowchart 200 of a process for producing a media asset with associated objects, in accordance with embodiments of the present disclosure. Steps 201-217 describe exemplary steps comprising the process depicted in flowchart 100 in accordance with the various embodiments herein described. In one embodiment, the process may be implemented in whole or in part as computer-executable instructions stored in a computer-readable medium and executed in a computing device.

As depicted in FIG. 2, the process may begin with script writing, during which entities may be identified. For example, actors, characters, scenes, scenery, products, items, dialogues, common phrases, etc. present in a finished script may be identified as objects. Indirect references to other entities, such as related materials, may also be identified. Additional entities may include exchanges, props, music numbers, settings, written portions of text, visual cues, and audio cues such as a sound, spoken phrase, or spoken word. Once completed, the script is received at step 201 in an object toolkit application. In some embodiments, some or all of the entities may also be identified in the object toolkit application at step 203, after the script is received.

At step 205, the object toolkit application may be used to generate one or more objects (as needed) based on the entities identified in step 203. A central object database is referenced at step 207 to retrieve pre-existing objects in the database mapped to the identified entities. Alternately, object records may be authored for entities without a prior presence. Object record generation may also be performed at step 205 through the object toolkit application, for example, via a graphical user interface of the application in order to add, modify, or delete object records in an object database.

According to an embodiment, once generated, the object records may be stored locally at step 209 with respect to the user, in a local object database, for example. Generated objects may be subsequently appended to a centralized object database, and accessed by multiple operators/users.

In an embodiment, objects may be optionally generated during a live production of a media asset. Live production of a media asset may include logging of entities produced or appearing during the production. When live production is determined, objects may be logged (added/recorded) at step 211 while production of the media asset is being performed. In these cases, object records for the objects may be generated with the object toolkit. Once records have been created, the objects may then be associated with the produced media assets (e.g., embedding the assets with the unique object code) at step 213. The generated object record may then (or instead) be exported for post production, editing, and broadcasting at step 215.

Alternately, where live production logging is not desired, the objects generated during from steps 201 through 209 may be exported at step 217 for post production. During post production, a video editor application may be used to access a media timeline. The object toolkit application may then be used to generate an object track populated with objects corresponding to the identified entities, and to create associations between the objects in the object track and portions of the media asset at specified times in the timeline of the media asset. The association may include a position (in a display), and/or a timestamp during the display timeline of the media asset. According to an embodiment, one or more keyframes in the timeline of a media asset may be associated with objects in the object track.

In still further embodiments, a key-frame may be associated to an action item. In such embodiments, the action item may be an object that corresponds to an action or function which may be triggered and performed. An action item may be implemented as, for example, the trigger to begin displaying an object of secondary content during the presentation of the underlying media asset, or a trigger to conclude the display of an object of secondary content The keyframes may be implemented as, for example, a marker on a timeline that has a temporal position, a value, and (optionally) ballistics between adjacent keyframes. Objects may be linked to the video/audio elements on the timeline. When linked objects are subsequently edited and shifted around in a timeline, the object metadata remains associated with the particular video and audio elements. For example, the position of the object in the object track may automatically adjust to correspond to the new position of the associated elements. In some embodiments, the video editor may comprise a commercial editor and use an object track or alternately a plug-in to generate the unique object and to associate the object-metadata with media assets.

Once the object is associated with a media asset, the tracks of the object and the media asset may be edited. In an embodiment, a graphical user interface may be instantiated that depicts graphical representations of the object, the media asset, and their respective tracks. The object and asset tracks may be represented to graphically depict the chronologic relativity between associated objects and assets. For example, an object may be associated to display during a portion of the assets presentation. Once the timeline has been edited, the media asset (with integrated object references) may be exported for storage prior to broadcast.

Generating Media Asset Timelines

Figure 3:
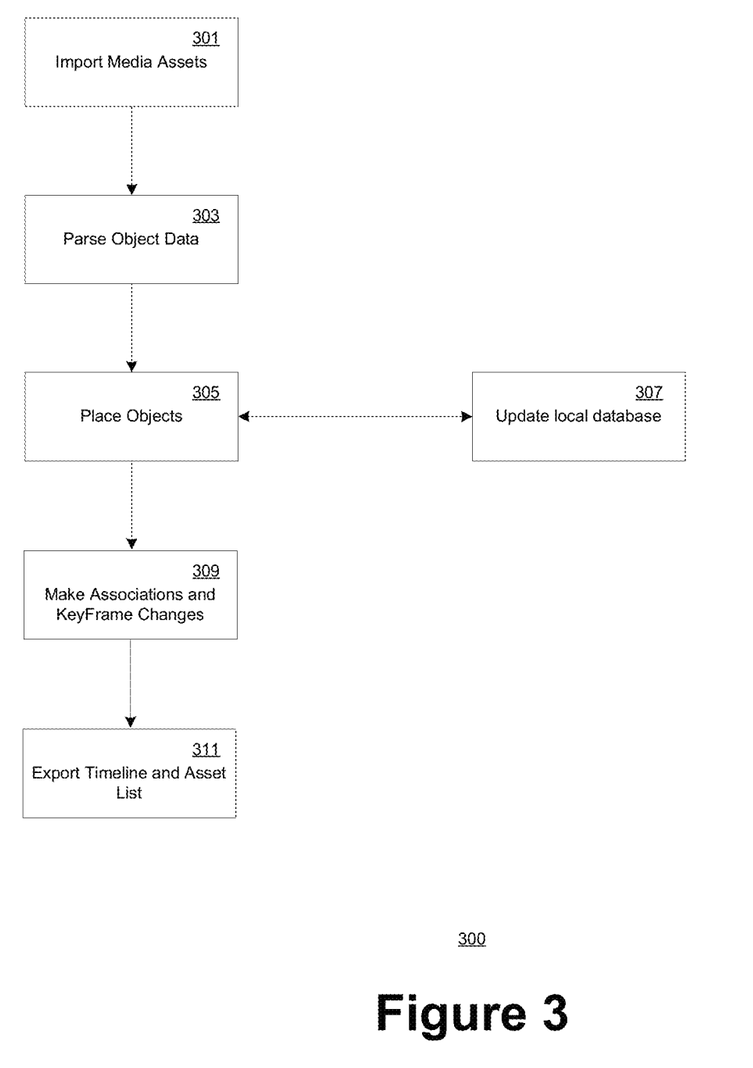
FIG. 3 depicts a flowchart of a process for generating a timeline of media assets, in accordance with embodiments of the present disclosure.

With reference now to FIG. 3, a flowchart 300 of a process for generating a timeline of media assets is depicted, in accordance with embodiments of the present disclosure. Steps 301-311 describe exemplary steps comprising the process depicted in flowchart 100 in accordance with the various embodiments herein described.

As depicted in FIG. 3, the process may begin by importing one or more media assets at step 301. Media assets may be received as produced audio, video, or multimedia files. In some embodiments, the media assets may be received as a pre-arranged sequence of frames corresponding to one or more tracks (e.g., an audio track for an audio asset, a video track for a video asset), the combination of which constitute a media timeline. The media assets may be parsed at step 303 and cross-referenced with the object database to determine the presence of pre-existing objects and object metadata which correspond to entities in one or more of the media assets received in step 301. If found, the object records may be referenced at step 305 for the objects identified during step 303. For example, the unique object identifiers (UID) and any other metadata such as the description of the object, may be referenced from the object database during the parse. A local object database (such as a SQL database or SQLite database) may be updated at step 307 to note the association of the object and the particular media asset in which the entity corresponding to the object appears. Once the objects are identified, the objects may be associated with the media assets at one or more frames at step 309. In addition, an object track may be automatically generated and populated with objects that are synchronized to the assets in the audio and video tracks at step 309.

Using a video editing application, the timeline of the media asset may be manipulated by rearranging the audio/video tracks with the use of a plug-in or application programming interface of the application. Subsequently, when the position in the audio/video track of an asset is rearranged, the position of the corresponding object may be automatically updated to follow suit. Once editing is completed, the completed asset timeline may be exported at step 311. In one embodiment, the completed timeline may include a list of assets and a list of associated objects with a timeline that describes when each of the interactive elements will be displayed or presented to the user. According to further embodiments, the list of objects may comprise the video, audio, imaging, and textual content that accompanies each asset in the asset list, and a list of destinations (e.g., content servers) for the content to be delivered for playout.

Exemplary Media Asset Timeline

Figure 4:
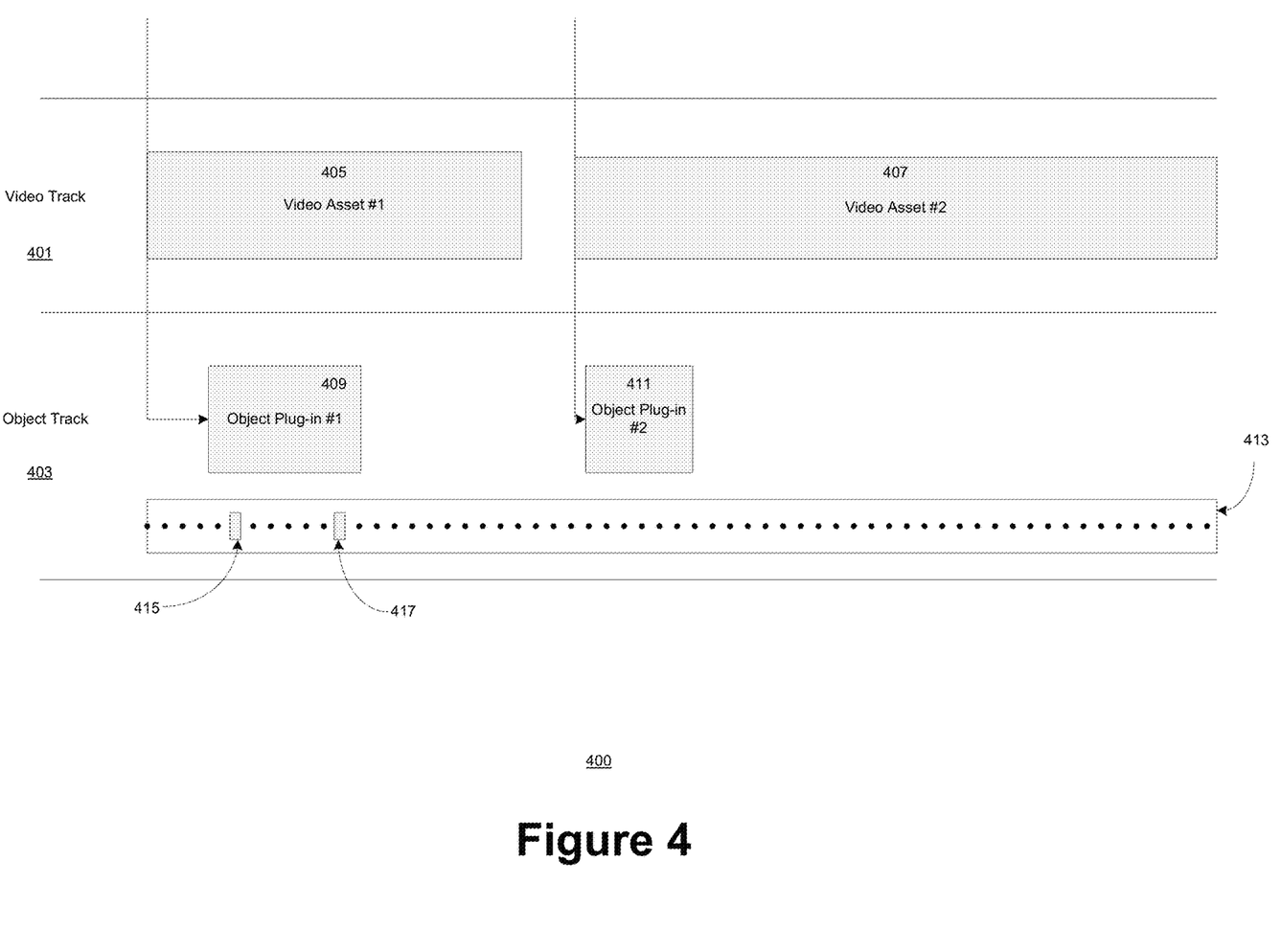
FIG. 4 depicts an exemplary timeline, in accordance with embodiments of the present disclosure.

With reference now to FIG. 4, an exemplary timeline 400 is depicted in accordance with embodiments of the present disclosure. As depicted in FIG. 4, the exemplary timeline 400 comprises an asset timeline (e.g., video track 401) and an object track 403 corresponding to the asset timeline and populated with objects associated with entities found in the asset timeline.

As shown in FIG. 4, the video track 401 includes a chronological representation of video assets (e.g., video asset 1 405, video asset 2 407). The object track 403 depicts object references (e.g., object plug-in 1 409, object plug-in 2 411) associated with each asset, and a respective time and duration during which the object may be presented to the user (if the object corresponds to secondary or supplemental material) based on the elapsed display of the corresponding video asset.

Thus, for example, Object Plug-In 1 409 may be presented to the user for a portion of time roughly during the middle of Video Asset 1 405, whereas Object Plug-in 2 411 may be presented to the user shortly after the beginning of Video Asset 2 407. According to further embodiments, overlapping objects may be represented in additional (and separate) object tracks. A plurality of object tracks may be generated for a single media asset track. In further embodiments, a display of all object tracks and the media asset tracks (and defined associations) may be generated and presented in the video editing application.

In some embodiments, an exemplary timeline 400 may include a graphical representation of the sequence of frames 413 constituting the particular media asset. As shown in FIG. 4, one or more frames of the sequence of frames 413 may be selected as key-frames (e.g., key frames 415, 417). The key-frames may represent a change in the sequence of frames, such as a scene change, a transition, or the start (or end) of a commercial break. Objects may be associated with key-frames, such that when a key-frame is displayed, an action item corresponding to the object may be triggered. For example, product information for an on-screen entity or a supplemental graphical or audio cue (e.g., a viewer poll or prompt) may be displayed in conjunction with the display of the key-frame.

Media Asset Distribution

Figure 5:
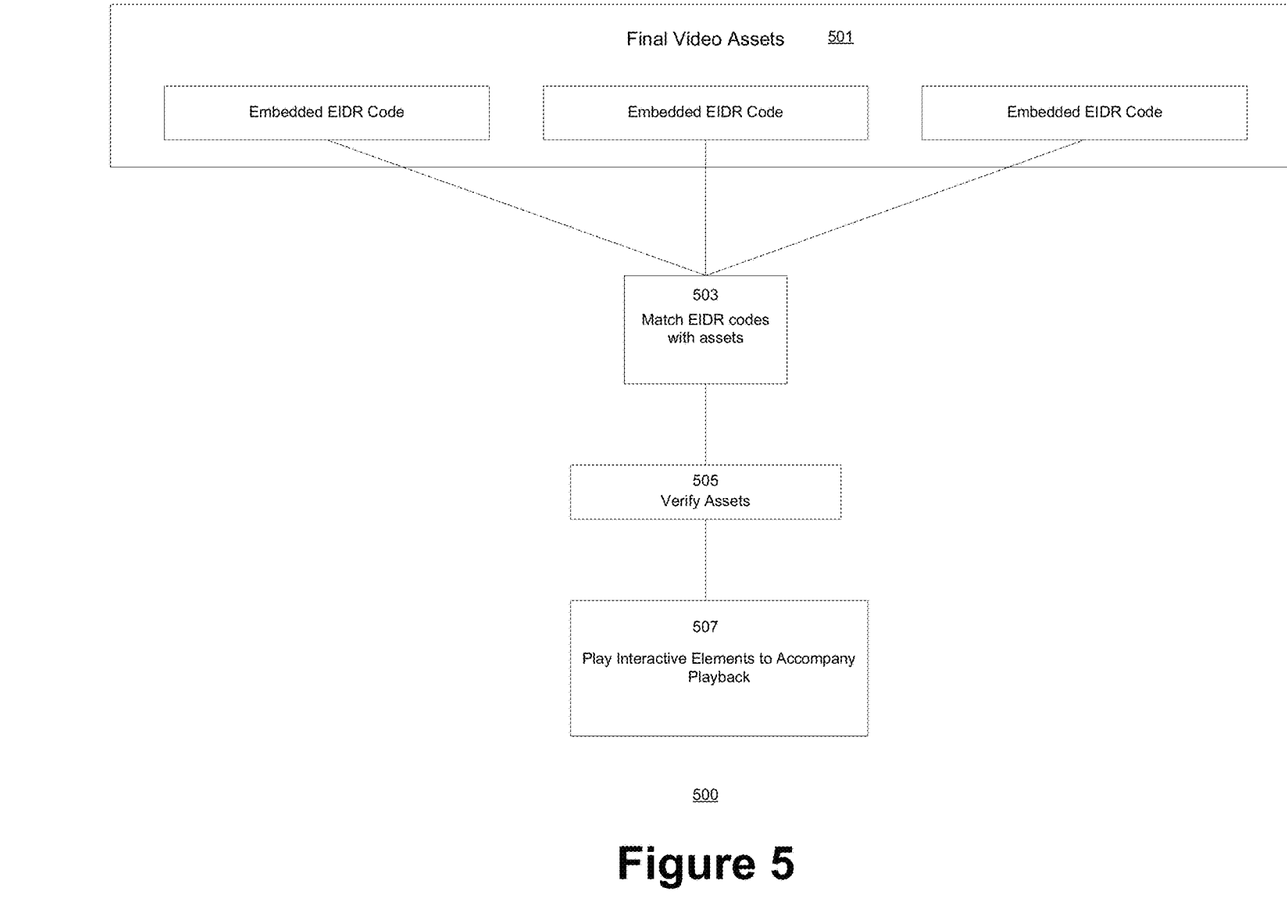
FIG. 5 depicts a flowchart of a process for distributing completed media assets, in accordance with embodiments of the present disclosure.

With reference now to FIG. 5, a flowchart 500 of a process for distributing completed media assets, in accordance with embodiments of the present disclosure. As depicted in FIG. 5, completed video assets are compiled into a list of assets at step 501. The completed video assets are subsequently matched with associated objects at 503. Matching the associated objects may be performed by parsing the object database with objects which match the EIDR codes of the produced video assets, for example.

After the objects and assets are matched, the assets may be verified at step 505 for accuracy against a main asset list and a content delivery network. Once verified, the asset timeline is ready for distribution (broadcasting) and viewing. When a viewer of a media asset with an operating companion device is detected, the appropriate interactive elements are displayed to accompany the video playback at the previously specified times at step 507. According to an embodiment, the video playback of the content may be performed on a primary display device, such as a television, a projector screen, or monitor. The secondary or companion device may in certain instances, be implemented as a smartphone, tablet, laptop computer or secondary monitor. In alternate embodiments, content and interactive elements may be presented to the user on the same display through such devices as internet connected televisions, set-top boxes, Blu-ray players, or gaming consoles.

Live Production

Figure 6:
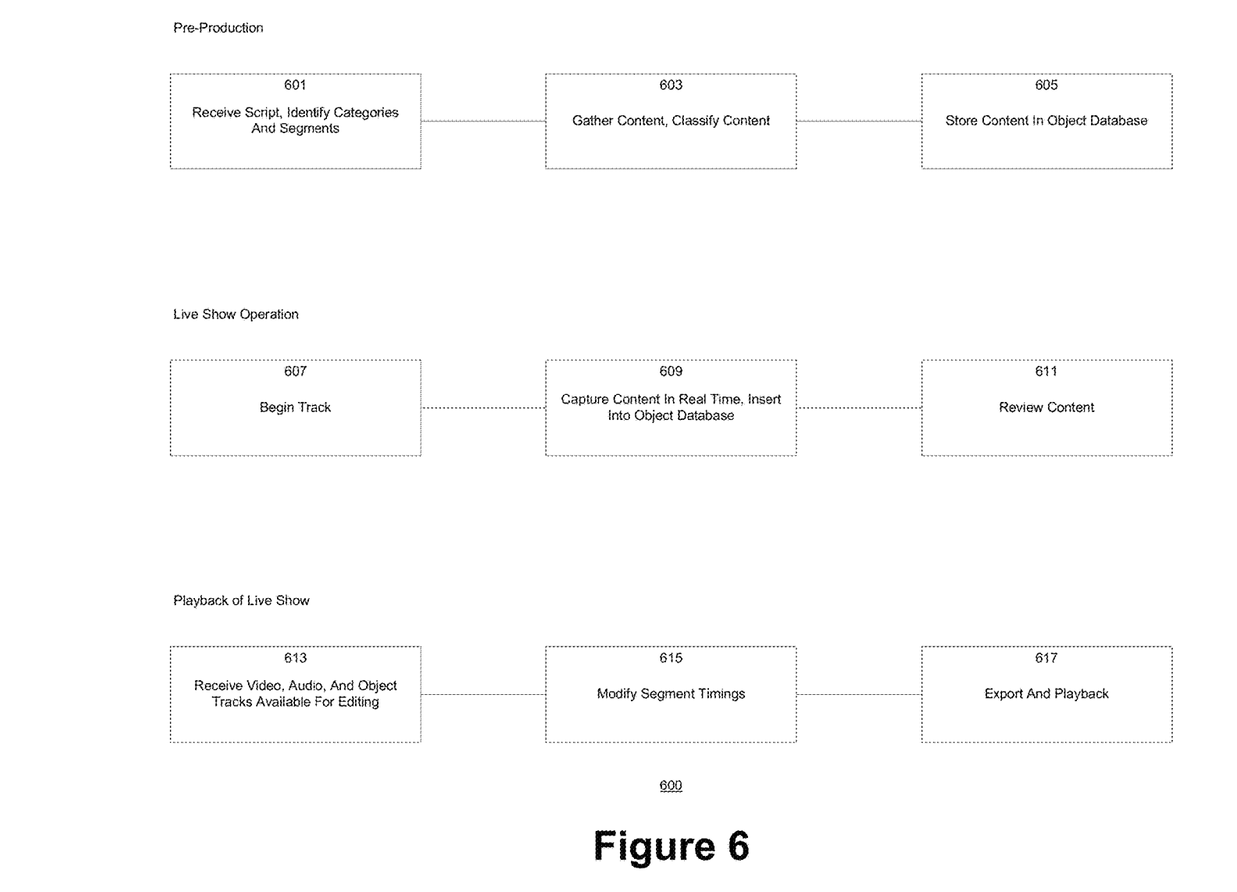
FIG. 6 depicts a flowchart of an exemplary process for producing a live media asset, in accordance with embodiments of the present disclosure.

With reference now to FIG. 6, a flowchart 600 of an exemplary process for producing a live media asset, in accordance with embodiments of the present disclosure. As depicted in FIG. 6, production of a live media asset may be performed in three different phases: a pre-production phase, a live operation phase; and during playback.

During the pre-production phase, a script may be received at step 601. The script may in some instances be a loose script, with defined segments, categories, sequences, or approximate durations, timings, etc. At step 603, the script may be reviewed (parsed) with the content being gathered, analyzed, classified among categories and sub-categories. In some instances, the entities may be identified during this step. Objects and object records may be generated for the entities and/or categories and pre-stored in an object database or local database at step 605.

During the live show operation phase, the various tracks of the live presentation may begin at step 607. In some instances, the tracks may commence without specified timings or specifically identified segments. During the presentation, producers, editors, or other media personnel may capture content during the live presentation in real-time, create corresponding objects and object records for the capture content, and store the records into the object database at step 609. Once stored, an editor is able to browse the content, preview, and disseminate objects as desired at step 611. During this step, segment start and end times (along with other timings) may be defined.

In some instances, live shows may be initially recorded and then broadcast with a slight (or substantial) taped delay. During the actual playback, the produced recording,—which may include defined timings and various imported media (audio, video, and object) tracks—are made available at step 613 for editing. Further adjustments to the recording may be performed at step 615 to correct or modify improper or non-optimal recordings. These adjustments may be performed according to non-live post-production processes, as described above. Finally, at step 617, the recorded show may be exported to a content distribution server and disseminated (broadcast) for presentation to viewers. Export of the completed media content may likewise be performed according to non-live content processes, also described above.

By using any of the systems or methods provided above, a standardized ecosystem for object-oriented metadata representation may be generated for increased flexibility, efficiency, and functionality in interactive element and content synchronization. Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for producing standardized object-oriented assets, the method comprising:
receiving a plurality of media assets chronologically arranged in an asset timeline;
parsing the plurality of media assets to identify a plurality of entities in the plurality of media assets;
referencing a central object database for a plurality of objects corresponding to the plurality of entities;
generating an object track comprising a separate timeline of the plurality of objects arranged to correspond to the plurality of entities at one or more pre-defined times; and
distributing a media content timeline that comprises the asset timeline and the object track through a content delivery network to present a first media asset of the plurality of media assets simultaneously with a plurality of viewer-interactive objects of the plurality of objects in a primary display device of a viewer,
wherein a viewer-interactive object comprises a reference to a second media asset of the plurality of media assets, the reference being operable to concurrently present the second media asset in response to a viewer-interaction with the viewer-interactive object during a presentation of the first media asset.

2. The method according to claim 1, wherein the media content timeline comprises at least one of: an audio track, a video track, and a live recording.

3. The method according to claim 1, wherein at least one entity of the plurality of entities comprises an entity identified in a script corresponding to the asset timeline.

4. The method according to claim 3, wherein the entity comprises at least one of:
   an actor;
   a character;
   an item;
   an exchange;
   a prop;
   a scene;
   a setting;
   a music number;
   a sound;
   a written portion of text;
   a visual cue;
   an audio cue;
   a spoken phrase; and
   a spoken word.

5. The method according to claim 1, further comprising exporting the media content timeline.

6. The method according to claim 1, wherein the referencing a central object database for a plurality of objects corresponding to the plurality of entities comprises:
   determining a live production of a media asset in the plurality of media assets; and
   logging the live production of the media asset to identify an additional one or more entities of the plurality of entities.

7. The method according to claim 1, further comprising dynamically editing the media content timeline in an instance of a video editing application executing on a computing system.

8. The method according to claim 7, wherein the dynamically editing the media content timeline comprises editing a plug-in of the video editing application to provide access to the media content timeline.

9. The method according to claim 7, wherein the dynamically editing the media content timeline comprises changing a relative position of an element in the media content timeline, wherein an association of the plurality of associations between the element and an object of the plurality of objects persists through a change in the relative position of the element.

10. The method according to claim 9, wherein changing the relative position of an element in the media content timeline comprises automatically changing a relative position in the object track of the object corresponding to the element.

11. The method according to claim 1, wherein retrieving the plurality of objects corresponding to the plurality of entities comprises generating a new object for each entity of the plurality of entities without a corresponding object in the central object database.

12. The method according to claim 11, wherein the generating the new object comprises storing the new object in the central object database.

13. The method according to claim 1, wherein accessing a media content timeline comprises generating a plurality of associations between the plurality of objects corresponding to the plurality of entities and the plurality of media assets comprised in the media content timeline.

14. The method according to claim 1, wherein, the second media asset is displayed in a second display device simultaneously with a presentation of the first media asset in the first display device according to the media content timeline.

15. A system for standardized object-oriented metadata, the system comprising:
   a memory;
   a plurality of object records stored in the memory and corresponding to a plurality of entities in a plurality of media assets, the plurality of object records comprising:
      a unique object identification corresponding to a unit of supplemental data;
      a description of the unit of supplemental data;
      an identification of a producer of a media asset of the plurality of media assets corresponding to the supplemental data;
      an object record database configured to store the plurality of object records;
   a processing device configured to execute programmed instructions stored in the memory to implement: an object toolkit application operable to create, modify, and delete an object record from the object record database, and a content editor plug-in operable to provide access to a configuration of a media timeline comprising a chronological arrangement of the plurality of media assets in an asset timeline, and a object track comprising a timeline of the plurality of objects corresponding to the plurality of entities in the plurality of media assets,
   wherein the media timeline is delivered via a content delivery network to present a first media asset of the plurality of media assets simultaneously with a plurality of viewer-interactive objects of the plurality of objects in a primary display device of a viewer,
   further wherein a viewer-interactive object comprises a reference to a second media asset, the reference being operable to concurrently present the second media asset in response to a viewer-interaction with the viewer-interactive object during a presentation of the first media asset.

16. The system according to claim 15, wherein the video editing application is further operable to generate the object track corresponding to the asset timeline, the object track comprising a plurality of objects associated with the plurality of entities in the first media asset, each object of the plurality of objects comprising an instantiation of an object record of the plurality of object records.

17. The system according to claim 16, wherein the video editing application is operable to modify a configuration of the asset timeline by modifying a plurality of relative positions of the plurality of elements in the asset timeline.

18. The system according to claim 17, wherein a relative position of an object is automatically adjusted to correspond to a change in a relative position of the element in the asset timeline associated with the object.

19. The system according to claim 16, wherein the object track is operable to generate an association between a plurality of types of rich temporal metadata and the plurality of entities.

20. The system according to claim 19, wherein a type of rich temporal metadata comprises at least one of:
   a plurality of dynamic Active Format Description (AFD) flags;
   a plurality of scene changes;
   a plurality of commercial position start times;
   a plurality of commercial position end times; and
   a pre-production metadata.

21. The system according to claim 15, wherein an object corresponding to an object record of the plurality of object records further corresponds to a product, wherein the object record further comprises a UPC code corresponding to the product.

22. The system according to claim 15, wherein an object record further comprises at least one of:
- a MAC ID corresponding to a computing device in which the object was generated;
- a GPS location corresponding to a position at which the object was generated; and
- a timestamp indicative of a time and a date at which the object was generated.

23. A method for importing media assets into a content editing system, the method comprising:
- importing an asset timeline comprising a plurality of media assets;
- determining the presence of object data in the plurality of media assets;
- parsing the plurality of media assets to collect the object data when the presence of the object data is determined;
- generating an object track comprising a timeline of the object data that is arranged to correspond to the plurality of media assets in the asset timeline at one or more pre-defined times;
- editing a media content timeline comprising the plurality of media assets to include the object data;
- adding key frame data at a plurality of key frames in the media content timeline;
- updating a local database with data from the media content timeline; and
- exporting the media content timeline as a file,
- wherein a first media asset of the plurality of media assets comprised in the media content timeline is configured to be presented in a primary display device and a viewer-interactive object corresponding to the object data is configured to be presented simultaneously with the first media asset according to the media content timeline,
- further wherein the viewer-interactive object comprises a reference to a second media asset, the reference being operable to concurrently present the second media asset in response to a viewer-interaction with the viewer-interactive object during a presentation of the first media asset.

24. The method according to claim 23, wherein a first media asset of the plurality of media assets comprises a sequence of frames.

25. The method according to claim 24, wherein a key frame of the plurality of key frames comprises an identified frame in the sequence of frames comprising the first media asset, the identified frame being indicative of a change in the media asset.

26. The method according to claim 25, wherein the key frame comprises a reference to a viewer-interactive element displayed during a display of the media content corresponding to the media content timeline.

27. The method according to claim 23, wherein the local database comprises a Structure Query Language (SQL) database.

28. The method according to claim 23, wherein exporting the media content timeline comprises exporting the plurality of media assets and the media content timeline corresponding to the plurality of media assets to a content delivery network.

29. The method according to claim 28, further comprising broadcasting the plurality of media assets according to the media content timeline over a content delivery network.

30. The method according to claim 29, wherein broadcasting the media content timeline comprises:
- compiling an asset list comprising the plurality of media assets;
- matching a plurality of object codes corresponding to the plurality of media assets in the asset list with a plurality of objects accessible to the content delivery network; and
- verifying the plurality of media assets in the content delivery network.

* * * * *